Dec. 22, 1931.  A. HERL  1,837,906
COMBINED HARVESTING AND THRASHING MACHINE
Filed March 15, 1928  4 Sheets-Sheet 3
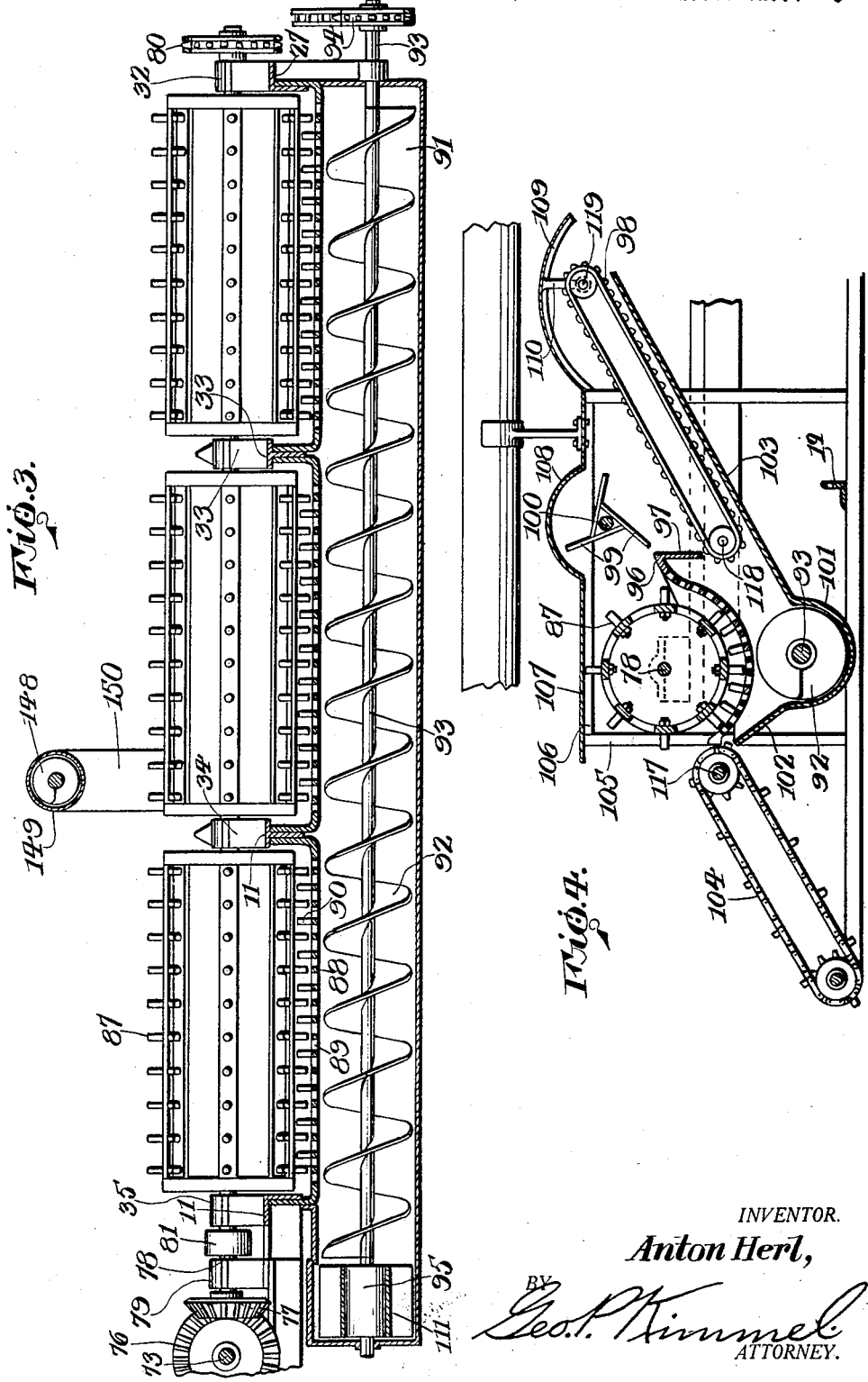
INVENTOR.
Anton Herl,
BY Geo. P. Kimmel
ATTORNEY.

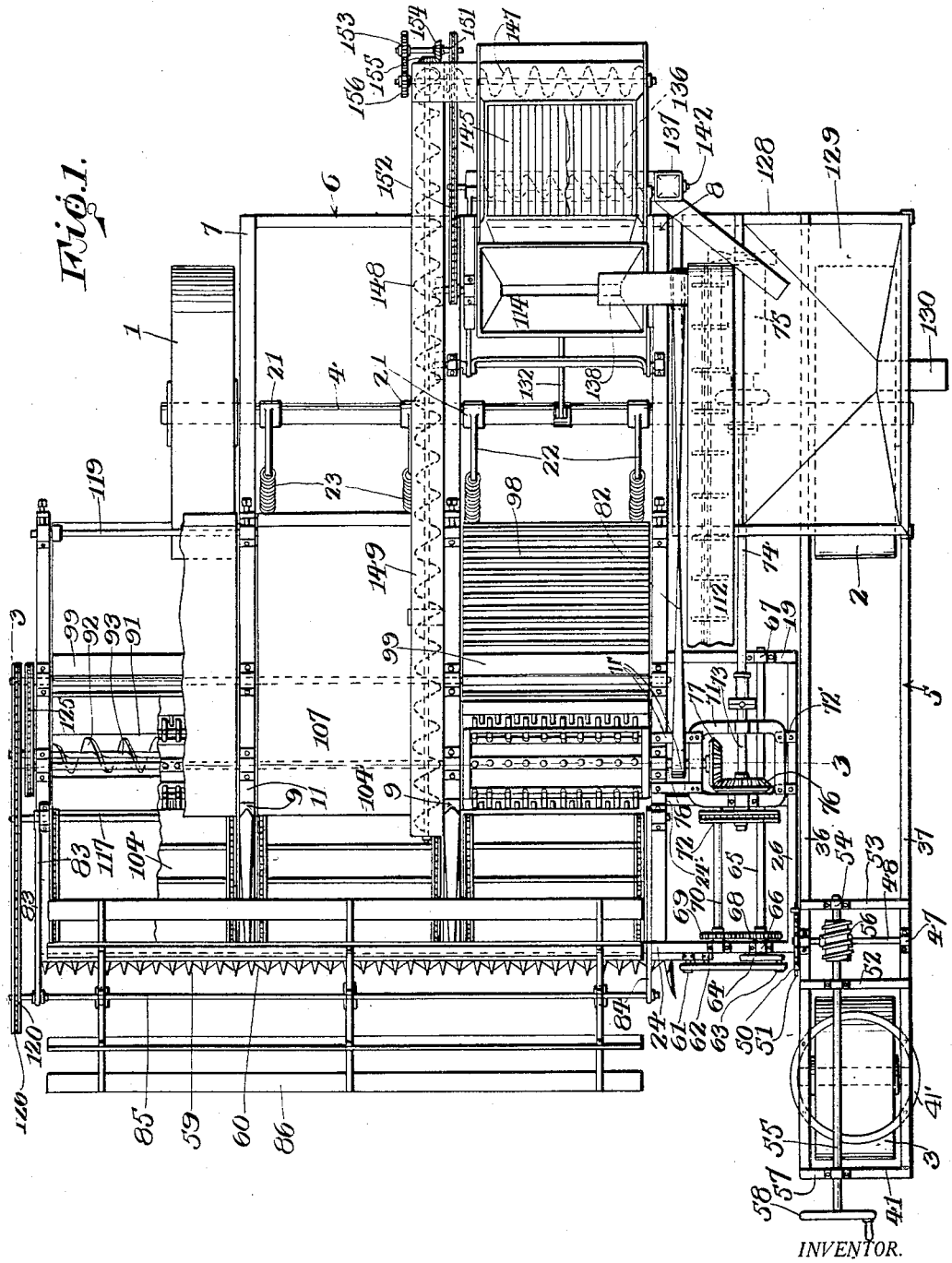

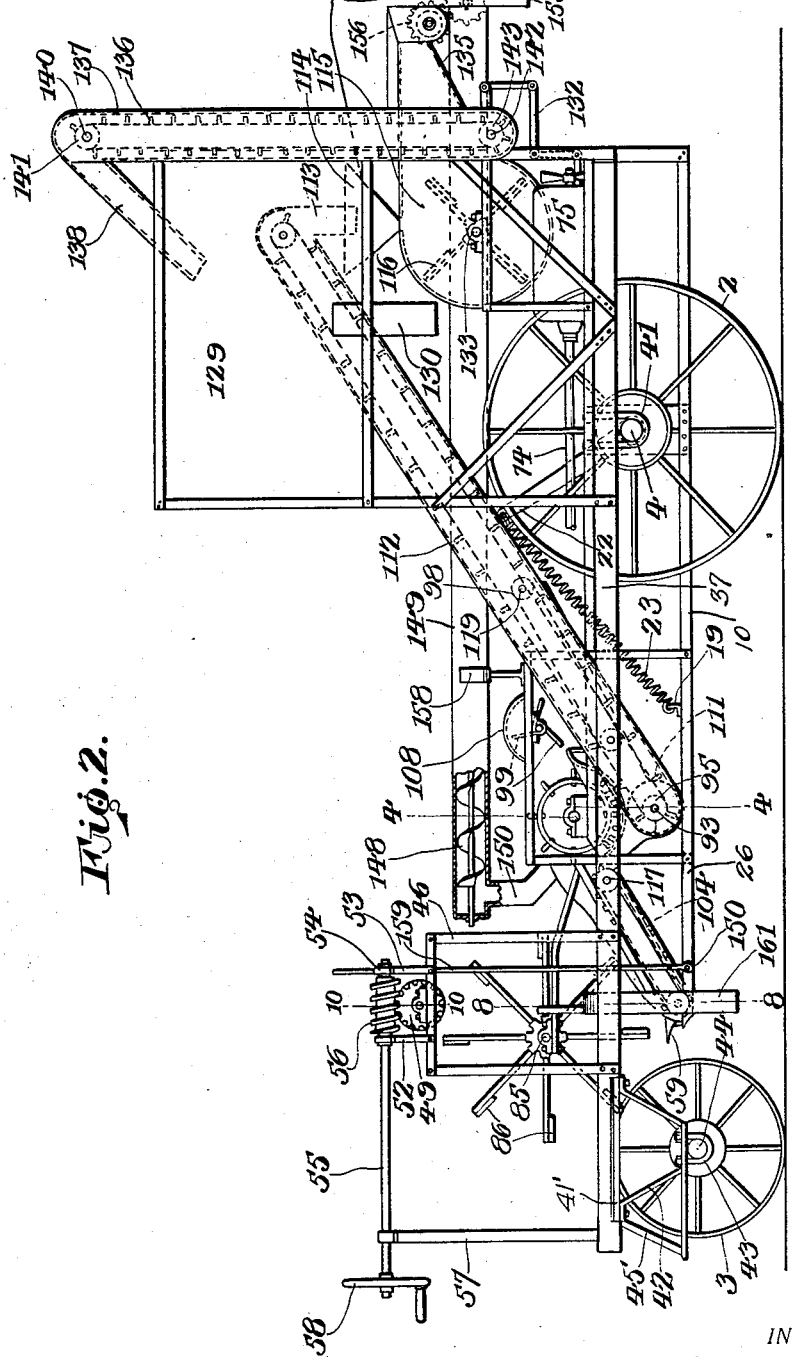

Dec. 22, 1931.  A. HERL  1,837,906
COMBINED HARVESTING AND THRASHING MACHINE
Filed March 15, 1928   4 Sheets-Sheet 4

INVENTOR.
Anton Herl,
BY
Geo. P. Kimmel
ATTORNEY.

Patented Dec. 22, 1931

1,837,906

UNITED STATES PATENT OFFICE

ANTON HERL, OF HAYS, KANSAS

COMBINED HARVESTING AND THRASHING MACHINE

Application filed March 15, 1928. Serial No. 261,852.

This invention relates to a combined harvesting and thrashing machine and has for its object to provide, in a manner as hereinafter set forth, a thoroughly efficient machine of such class of a simplified construction with respect to the types of machines of such character now generally employed.

Further objects of the invention are to provide, in a manner as hereinafter set forth, a machine of such class which is comparatively simple in its construction and arrangement, strong, durable, compact, capable of being operated with great facility, thoroughly efficient in its use, comparatively light in weight, rugged, providing for the separation of the grain from the straw with the loss of grain reduced to a minimum, readily assembled and comparatively inexpensive to set up.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1 is a top plan view, partly broken away of a combined harvesting and thrashing machine in accordance with this invention.

Figure 2 is a side elevation thereof.

Figure 3 is a section on line 3—3 Figure 1.

Figure 4 is a section on line 4—4 Figure 2.

Figure 5:
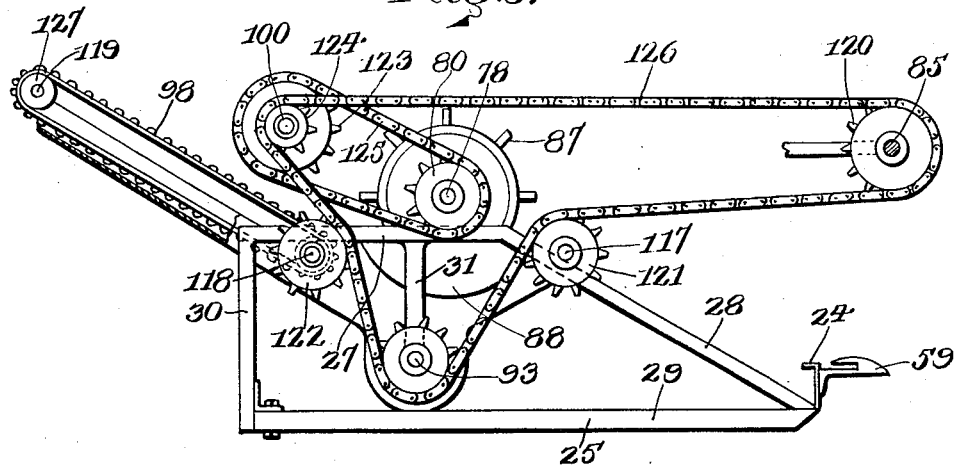
Figure 5 is a fragmentary view looking toward one side of the machine showing chain drives for certain of the elements of the machine.
Figure 6:
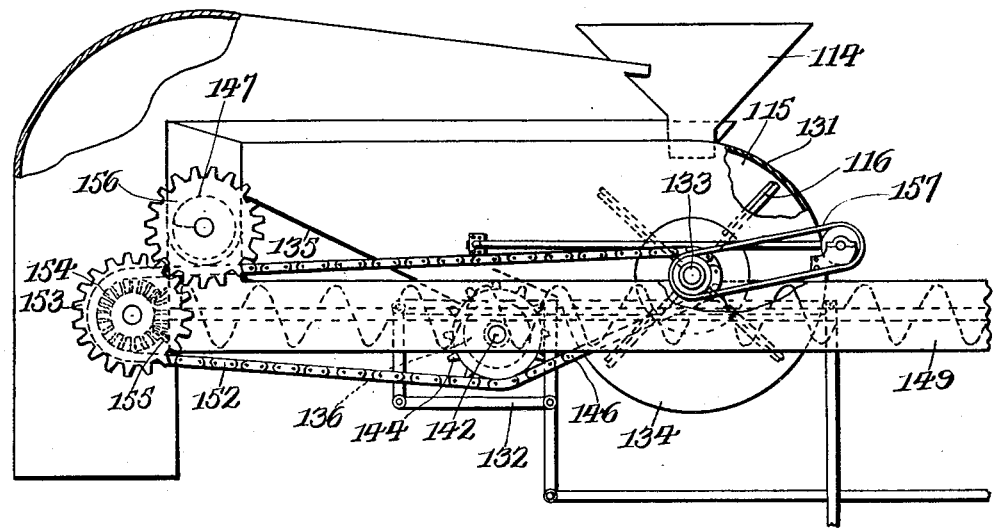
Figure 6 is a fragmentary view in side elevation showing the blower device or fan and the driving means therefor.

Referring to the drawings a combined harvesting and thrashing machine, in accordance with this invention, includes a pair of rear wheels 1, 2 and a single front wheel 3 which is arranged forwardly of the wheel 2, in alignment therewith and is of smaller diameter than the latter. The rear wheels 1, 2 are revolubly mounted upon an axle 4. Positioned at the rear thereof upon, as well as projecting rearwardly from the axle 4 is a stationary frame 5 and a spring controlled balanced frame 6 weighted at its rear end. The frames 5, 6 are positioned in sidewise arrangement and the former extends forwardly from the latter.

The frame 6 depends below the frame 5 and includes a pair of outer sections 7, 8 and an intermediate section 9. Each section includes a lower bar 10 and an upper bar 11. The sections 8 and 9 are connected together by an angle iron or bar 19 which is secured upon the upper faces of the lower bars 10. Supported from the frame 6, in proximity to the rear end thereof is an axle 4 which projects a substantial distance from the sections 7 and 8. The wheels 1 and 2 are carried on the projecting ends of the axle 4 and the latter projects a greater distance from the section 8 than the section 7. Fixedly secured to the axle 4 is a series of spaced collars 21 and each of which has formed integral therewith a forwardly extending and upwardly inclined crank arm 22. The crank arms 22 are arranged between the intermediate and outer sections of the balanced frame. Connected with the forward ends of the crank arms 22 are forwardly extending and downwardly inclined coiled springs 23 which have their lower ends fixedly secured to the angle iron 19. The springs 23 in connection with the weighted rear end of frame 6 provide a balance for the latter. The forward ends of the sections 7, 8 and 9 of the balanced frame are connected to a channel iron 24 which is disposed transversely with respect to the balanced frame and projects an appropriate distance from the sections 7 and also the section 8 of said frame.

Arranged adjacent the section 7 as well as being spaced therefrom and secured therewith is a skeleton support conforming in contour to the shape of the forward portion of said section 7. The skeleton support is indicated at 25. The forward end of the support 25 is secured to the channel iron 24. The skeleton support 25 includes a top bar 27 having the forward portion thereof downwardly inclined as at 28, a bottom bar 29 and a rear bar 30. The high part of the top bar 27 of the support 25 has a depending bearing 31. Mounted upon the high part of the bar 27 of the support 25 and also upon the bars 11 are bearings 32, 33, 34 and 35. See Figure 3. The purpose of the bearings 32 to 35 will be presently referred to.

Opposing and spaced from the lower bar of section 8 is a supporting bar 26 which has its forward end connected to the channel iron 24. The angle iron 19 is secured to the frame 25 and to the rear end of supporting bar 26.

The stationary frame 5 includes a pair of side bars 36, 37 arranged in opposed spaced relation, a short bar 38 opposing and spaced from the rear of the bar 36, a connecting bar 39 between the forward end of the bar 38 and the rear portion of the bar 36, a rear bar 40 connecting the rear ends of the bars 36, 37 and 38 together and a front bar 41 connecting the forward ends of the bars 36, 37 together. The bar 36 is spaced above the supporting bar 26 and the bar 38 is spaced from the section 8 of the balanced frame. The bar 39 is arranged rearwardly of the bar 27 and the axle 4 extends through the bars 36 and 38 and into the bar 37. Bearings 42 are carried by the bar 36 for the axle 4. The rear wheel 2 is positioned between the bars 36 and 37.

Carried by a turn wheel 41', shiftably mounted in the forward portion of the frame 5 and depending therefrom are hangers 42 provided with bearings 43. The forward axle of the machine is indicated at 44 and which is mounted in the bearings 43. The front wheel 3 is carried by the axle 44. Depending from the forward portion of the frame 5 is a step 45. Secured to the forward portion of the frame 5 is an upstanding supporting structure 46 provided with bearings 47 for a shaft 48 disposed transversely with respect to the frame 5 and carrying a worm gear 49 and a disc 50 formed with radially disposed pins 51. The disc 50 is arranged inwardly with respect to the bar 36 of the frame 5. The worm gear 49 is arranged above and in a position between the bars 36, 37 of the frame 5. Mounted upon the top of the structure 46 are spaced, upstanding supports 52, 53, provided at their upper ends with bearings 54 for a shaft 55 provided with a worm 56 which meshes with the pinion 49. The shaft 55 projects forwardly with respect to the structure 46 and is mounted in a vertical support 57. The shaft 55 at its forward end carries a turn wheel 58. The worm pinion 59 and gear 56, in connection with the shaft 48 is provided for rotating the disc 50 for a purpose to be presently referred to.

Secured to the channel iron 24 is the stationary cutter bar 59 of a cutter device and the latter includes a reciprocatory bar 60 slidably mounted in the bar 49 and extended at one end laterally with respect to the outer section 8 of the balanced frame. See Figure 1. The bar 60 carries a pin 61, to which is attached a pitman 62 pivotally attached to a pin 63 eccentrically connected to a rotatable disc 64 carried by a shaft 65. The shaft 65 is mounted in bearings 66, 67 respectively, carried by the channel iron 24 and a bar 24' connected to the bar 10 of section 8 and to the bar 26. The shaft 65 carries a gear 68, which meshes with a gear 69 carried by a shaft 70 supported from a frame 71 and driven by a gear and chain connection 72 operated from a shaft 73 journaled in the frame 71 and coupled to a driving shaft 74 operated from a motor 75.

The frame 71 is secured to the top of the section 8 of the balanced frame, by spaced coupling members 71'. See Figure 1. The frame 71 is mounted on supports 72' carried by the bar 26. The shaft 73 carries a beveled gear 76 which meshes with and drives a beveled gear 77 secured to the outer end of a drive shaft 78 for a series of thrasher elements. The shaft 78 is mounted in a bearing 78 carried by the frame 71 and also extends through the bearings 35, 34, 33 and 32, see Figure 3, and has its other end provided with a sprocket gear 80 arranged exteriorly of the bearing 32. The shaft 78 between the bearings 35 and 79 carries a driving pulley 81 for a twisted transmission belt 82 for a purpose to be presently referred to. See Figure 1.

Extending forwardly from the support 25 and the section 8 of the balanced frame are arms 83, 84 for rotatably supporting the operating shaft 85 of a raker element 86 which is in the form of a slatted drum. The raker element is placed a substantial distance above the cutter device. See Figure 2.

With reference to Figures 3 and 4, the thrasher or beater elements are in the form of slotted cylinders provided with spaced rows of radially disposed teeth. As illustrated three thrasher elements are shown, indicated at 87 and arranged in spaced, endwise opposed arrangement. One of the thrasher elements is positioned between the sections 8 and 9 of the frame 6, another between sections 9 and 7 of the frame 6 and the other between section 7 of the frame 6 and support 25. Arranged below and opposing each end of each thrasher element is a grater member of concave cross section. Each grater member is spaced throughout from its associated thrasher cylinder. Each grater element at its rear extends upwardly to a point aligning with shaft 78 and then depends downwardly in a vertical plane to a point in close proximity to the forward or lower end of a straw conveyor to be presently referred to. The front of each grater member is positioned forwardly of the shaft 18 and arranged below the rear or upper end of a front conveyor which leads upwardly to a thrashing cylinder and such conveyor will be presently referred to. Each of said members is indicated at 88, formed with openings 89 and pins 90 which are disposed between the pins of the thrasher elements. One of the concave graters is interposed between the sections 8 and 9 of the frame 6, another between the sections 9 and 7 of the frame 6 and the other between the section 7 of the frame 6 and the support 25. The graters are fixedly secured in position. Arranged below and common to the graters 88 is a collecting trough 91 and operating in the latter is a spiral conveyor 92, carried by a shaft 93 which is journaled in the ends of the trough 91, projects at one end from one of the ends of the trough and carries a sprocket gear 94 on its projecting end. The trough 91 projects beyond the section 8 of frame 5. The shaft 93 has secured thereto, within the trough 91 at one end thereof, a drive pulley 95 for an endless conveyor to be presently referred to. The pulley is arranged adjacent one end of the spiral conveyor 92. See Figure 3. The conveyor 92 provides for conveying the grain to that end of the trough in which is arranged the pulley 95. The graters 88 are positioned a substantial distance below and from the rear sides of the thrasher elements 87 and each of which includes a rearward extension 96 terminating in a depending vertically disposed portion 97 acting as a stop. See Figure 4. Extending rearwardly from each grater 88 and at an upward inclination is an endless conveyor 98 having its lower end, which is its forward end, arranged below the depending portion 97. The conveyors 98 are employed for carrying off the straw. Arranged rearwardly of the thrasher elements 37 and above and rearwardly of the extensions 96, as well as over the forward portion of the conveyors 98 are rotatable straw-shifting members or elements 99 for forcing the straw, as it leaves the thrashing elements over the extensions 96 and onto the conveyors 98. A common shaft for operating the elements 99 is indicated at 100. See Figure 4. The collecting trough 91, with reference to Figure 4, is formed of a semi-circular lower portion 101 and a flaring upper portion and with the front of the latter, indicated at 102 of less height and cross sectional length than the rear of the upper portion as indicated at 103. The rear of the upper portion 103 is extended to the upper or rear end of the conveyors 98. The conveyor 92 operates in the lower portion 101 of the trough 91.

Extending rearwardly from the cutter device at an upward inclination to a point in close proximity to the thrasher elements and graters are endless conveyors 104. See Figures 1 and 4. The material to be thrashed is raked upon the conveyors 104 by the raker element 86 and is conducted to the thrasher elements and graters by the conveyors or raddles 104, where it is acted upon and the grain passes into the trough 86 and the straw upon the conveyors 98. The trough 91 is constructed in a manner so that it can be positioned between the sections of the frame 6 and also between one of the sections of the frame 6 and the support 25.

Secured to the frame 6 and also to the support 25 are standards 105 which extend above said frame 6. The standards 105 are connected together at their upper ends by cross pieces 106. The standards 105 and cross pieces 106 provide a supporting structure for a hood or cover 107 which is positioned over the thrasher elements, graters and partly over the conveyors 98. The cover 107 is formed with an upwardly extending portion 108 to provide a clearance for the operation of the straw shifting elements or members 99. The cover 107 has a rearward extension 109 carrying hangers 110.

Traveling over the pulley 95 is the lower end of a rearwardly extending and upwardly inclined endless conveyor 111 which travels through a closed chute 112 having its rear or upper end formed with a laterally disposed depending spout 113 for discharging the grain therefrom into an intake funnel 114 which opens into a blower or fan chamber 115. The fan in the chamber 115 is indicated at 116. The fan 116 is operated from the belt 82. See Figure 1.

Operated from the sprocket wheel 80 on the shaft 78 is a drive connection for the shafts 85, 93, 100, 117 and 118. The shaft 85 carries a sprocket gear 120. The shaft 117 carries a sprocket pinion 121. The shaft 93 carries the sprocket pinion 94. The shaft 118 carries a sprocket pinion 122 and the shaft 100 a sprocket gear 123 and a sprocket pinion 124. See Figure 5. The shaft 117 is employed for operating the conveyors 104. The shaft 118 is employed for operating the conveyors 98 and the shaft 100 is employed for operating the straw shifting elements or members 99. Extending from the sprocket gear 80 to the sprocket gear 123 is a drive chain 125. Traveling around the sprocket pinion 124, sprocket gear 120, over sprocket pinion 121 and around sprocket gear 94 is a chain drive 126. See Figure 5. On the operation of the shaft 78, the thrasher elements, spiral conveyor 92, straw shifting elements 99, conveyors 98 and 104 will be simultaneously operated, and on the operation of shaft 78, the conveyor 111 will be operated from the pulley 95. The hangers 110 carry a shaft 119 provided with pulleys 127 for the upper or rear ends of the conveyors 98. The chute 112 is supported from an upstanding frame 128 carried by the rear end of frame 6. The frame 128 supports a bin or hopper 129 for the grain and the latter has a lateral spout 130 for the discharge of the grain into a wagon or receptacle. The chute 112 is arranged inwardly of the bin or hopper 129.

The fan chamber 115 is provided by a housing 131 arranged above and supported from sections 8 and 9 of the frame 5 at the rear end of the latter. A stabilizing mechanism 132 is provided for the blower or fan device, and which functions to stabilize such device in a level position when the frame 5 is tilted in the manner as hereinafter referred to. The fan shaft is indicated at 133 and driven from the belt 82. The bottom 134 of the housing 131 has an inclined part 135 for directing the grain to a spiral conveyor 136 arranged below the lower end of the inclined part 135 of the bottom 134. The spiral conveyor is disposed transversely with respect to the housing 131 and is provided for conveying the grain to the lower end of a vertically disposed endless conveyor 136, operating through a chute 137 which opens at its lower end into the housing 131. The chute 137 extends above the bin or hopper 129 and is provided with a depending spout 138 which discharges into the bin or hopper 129. The chute 137 supports a shaft 140, provided with a pulley 141, over which travels the upper end of the conveyor 136. The chute 137 further supports at its lower end a shaft 142, provided with a drive pulley 143 for the conveyor 136. The shaft 142 extends from the lower end of the chute 137 and carries a sprocket gear 144. Arranged above the inclined portion 135 of the bottom of the housing 131 is a shaker device 145. The sprocket gear 144 is operated by a chain drive 146 from the shaft 133. Positioned at the upper end of the inclined portion 135 of the housing 131, as well as depending therebelow, is a spiral conveyor 147 disposed transversely of and within the housing 131 and which is provided for conducting off the non-thrashed grain and discharging it into a forwardly extending spiral conveyor 148 and which conducts the same to one of the conveyors 104 for supplying it to a thrasher element. The conveyor 148 is mounted in a casing 149 having its forward end provided with a depending discharge spout 150. See Figure 2. The conveyor 148 is operated from the chain drive 146. A shaft 151 is supported from the rear end of the chute 149, and carries a sprocket pinion 142, a sprocket gear 153 and a beveled gear 154. The sprocket pinion 152 is driven from the chain 146. The beveled gear 154 meshes with a beveled gear 155 provided on the rear end of the shaft of the spiral conveyor 148. The sprocket gear 153 meshes with a sprocket gear 156 formed on one end of the shaft of the spiral conveyor 147, whereby the latter is operated simultaneously with the spiral conveyor 148. The shaker device 145 is operated by a belt drive 157, from the fan shaft 133. The casing or chute 149 is mounted on a support 158. See Figure 2.

The frame 6 is tilted by a vertically shiftable apertured lifting rod 159 which is pivotally connected with frame 6. The rod 159 selectively receives the pins 51 carried by the disk 50 to provide for the elevating or lowering of the rod. A guide means 161 is provided for frame 6.

The frame 6 constitutes the truck of the machine and the bars 38 and 39 provide a laterally offset or sub-frame for the motor, and that frame which supports the bin or hopper. The guiding means 161, in connection with the support 26 tends to maintain the frame 6 in line with frame 5.

The conveyors or raddles 104 carry the cut wheat from the cutter device into the thrasher elements 87 at an angle of 30°, where it is thrashed at a spread, the full width of the frame 5. This provides for the separation of the grain from the straw at least 97° between the concave graters. From there the straw is carried over to conveyors or raddles 98, at a spread of approximately twenty-seven and one-half feet. Whatever grain is left will fall through the slats of conveyors 98 and slide down the portion 103 of the trough 91 into the bottom 101 of the latter. The grain passing through the concave graters 88 will fall into bottom 101 of trough 91. The conveyor 91 will conduct the grain to conveyor 111 and which in turn will elevate it and discharge some in hopper 114 to be acted upon by the fan to clean the chaff from the grain. The conveyor 136 will conduct the cleaned grain to conveyor 137 which in turn will discharge the grain into bin or hopper 129.

It is thought that the many advantages of a machine in accordance with this invention and for the purpose set forth can be readily understood from the foregoing description, taken in connection with the accompanying drawings, wherein is shown the preferred embodiment of the invention, but it is to be understood that changes can be had which fall within the scope of the invention as claimed.

What I claim is:

1. In a machine for the purpose set forth, a set of rotatable thrashing cylinders arranged in endwise opposed relation, an operating shaft common thereto, a set of endless front conveyors arranged forwardly of and extending at an upward inclination to said cylinders for conveying cut wheat thereto, concave graters, each arranged below, opposing the ends and rear of a cylinder and spaced throughout from the latter, straw conveyors of the endless slatted type arranged rearwardly of and extending upwardly at an inclination from front to rear, each grater having its front arranged below and in proximity to the rear end of a front conveyor and extending upwardly at its rear to a point substantially in alignment with said shaft and then downwardly in a vertical direction to a point in close proximity to the forward end of a straw conveyor, and a grain collecting trough positioned directly below and common to said graters and including an upwardly inclined front part extending to the rear ends of the front conveyors and a rear part extending rearwardly at an upward inclination from a point below and forwardly of the front ends of the straw conveyors to the rear ends of the latter.

2. In a machine for the purpose set forth, parallel spaced supports, bearings mounted on the tops thereof, thrashing cylinders arranged in endwise opposed relation, and interposed between said supports, an operating shaft common to said cylinders and journalled in said bearings, conveying means at the front of said cylinders for conducting cut wheat thereto, straw conveyors arranged rearwardly of said cylinders, spaced concave graters, each arranged below, opposing the ends, front and rear of a cylinder and spaced throughout from the latter, said graters having their ends secured to said supports, each grater having the top edge of its front positioned below the front of a cylinder and its rear edge substantially aligning with the longitudinal median of a cylinder, each grater at its rear being formed with a vertically disposed depending portion extending to a point in close proximity to the forward end of a straw conveyor, and a grain collecting trough positioned directly below and common to said graters, said trough having its front extending to the rear end of said front conveying means and its rear extended and opposing in spaced relation throughout the bottom of said straw conveyors.

3. In a machine for the purpose set forth, parallel spaced supports, bearings mounted on the tops thereof, thrashing cylinders arranged in endwise opposed relation, and interposed between said supports, an operating shaft common to said cylinders and journalled in said bearings, conveying means at the front of said cylinders for conducting cut wheat thereto, straw conveyors arranged rearwardly of said cylinders, spaced concave graters, each arranged below, opposing the ends, front and rear of a cylinder and spaced throughout from the latter, said graters having their ends secured to said supports, each grater having the top edge of its front positioned below the front of a cylinder and its rear edge substantially aligning with the longitudinal median of a cylinder, each grater at its rear being formed with a vertically disposed depending portion extending to a point in close proximity to the forward end of a straw conveyor, a grain collecting trough positioned directly below and common to said graters, said trough having its front extending to the rear end of said front conveying means and its rear extended and opposing in spaced relation throughout the bottom of said straw conveyors, and straw pushers, each positioned rearwardly of and above the vertically disposed portion of a grater and above a straw conveyor.

In testimony whereof, I affix my signature hereto.

ANTON HERL.